United States Patent [19]

Stahl

[11] Patent Number: 4,479,743
[45] Date of Patent: Oct. 30, 1984

[54] WEAR RESISTANT INSERT FOR PARTICULATE MATERIAL FLOW DUCTS

[76] Inventor: Ronald F. Stahl, 9082 Big Hand, Richmond, Mich. 48092

[21] Appl. No.: 504,538

[22] Filed: Jun. 15, 1983

[51] Int. Cl.³ .......................................... B65G 53/52
[52] U.S. Cl. .................................... 406/193; 285/16
[58] Field of Search ............... 406/193, 191; 138/92, 138/172; 285/16, 17, 127

[56] References Cited

U.S. PATENT DOCUMENTS 3,656,440  4/1972  Grey .................................. 110/8 R
4,202,280  5/1980  Bereiter et al. ....................... 110/216

FOREIGN PATENT DOCUMENTS 823003   9/1969  Canada ............................... 406/193
1001186  1/1957  Fed. Rep. of Germany ......... 406/193

Primary Examiner—Jeffrey V. Nase
Assistant Examiner—Daniel R. Edelbrock
Attorney, Agent, or Firm—Basile, Weintraub & Hanlon

[57] ABSTRACT

A wear resistant body mountable at a directional change point within a particulate material duct. A plurality of successively spaced cavities are formed in the body to trap and collect particulates flowing across the body such that the collected particulates act as a wear resistant barrier to wear of the body and the adjacent inner wall surface of the duct. A plurality of spaced, planar ribs are mounted on the body, with adjacent ribs defining a cavity therebetween.

3 Claims, 6 Drawing Figures

4,479,743

WEAR RESISTANT INSERT FOR PARTICULATE MATERIAL FLOW DUCTS

BACKGROUND OF THE INVENTION

1. Field Of The Invention

This invention relates, in general, to ducts carrying a flow of particulate material and, more specifically, to wear resistant inserts for use at directional change points in particulate material flow ducts.

2. Description Of The Prior Art

In many manufacturing and industrial operations, ducts and conduits are utilized to transport or carry particulate material between various locations, exhaust particulate material, such as ash, from incinerators, furnaces, etc., and to separate heavier particles from lighter particles as in cyclone separators. Such particulate flow streams encounter many directional change points, such as Y-intercepts, branches, 45° or 90° elbows or bends, etc. as the material flows through the ducts. Because the particulate material typically flows at a high velocity through the ducts, it acts as an extremely abrasive material as it strikes the inner surface of the ducts at the directional change points. The abrasion caused by the particulate material leads to a rapid deterioration of the duct wall which requires frequent repair or replacement.

Wear plates are typically mounted on the appropriate inner wall surfaces of the ducts at the directional change points to minimize duct wear at directional change points. Such wear plates are typically formed of a thick abrasive resistant material, such as cast iron, which, while reducing the abrasion of the duct surfaces, still must be replaced at frequent intervals.

Thus, it would be desirable to provide a wear resistant insert for particulate material flow ducts which overcomes the problems of previously devised wear resistant inserts. It would also be desirable to provide a wear resistant insert for particulate material flow ducts which greatly minimizes the wear on the inner wall surfaces of the ducts at various directional change points along the duct. Finally, it would be desirable to provide a wear resistant insert for particulate material flow ducts which is inexpensive to manufacture and can be easily and inexpensively repaired or replaced.

SUMMARY OF THE INVENTION

The present invention comprises a wear resistant insert for use in ducts carrying a high velocity flow of particulate material. The insert includes a body which is mountable within the duct.

Means, mounted on the body are provided for forming a plurality of spaced cavities in the body. The spaced cavities collect particulates flowing across the body such that the particulate material itself acts as an abrasion or wear resistant barrier to further erosion of the wear resistant insert and the adjacent inner wall surface of the duct.

In a preferred embodiment, the means for forming the cavities includes a plurality of planar rib members which are mouned on the inner surfaces of opposed side walls and a recessed central wall of the body. Preferably, the ribs are formed in first and second sets, with the first set being mounted on the recessed central wall portion and the second set mounted on the opposed side walls of the body.

In order to maximize collection of the particulates flowing across the body, the first set of spaced ribs is mounted at a first pre-determined angle with respect to the central wall portion of the body. As the body is intended to be mounted at a directional change point within the duct, the first set of ribs are preferably disposed so as to be substantially parallel to the oncoming flow of particulate material. The second set of ribs is disposed at a second different, pre-determined angle with respect to the first set of ribs so as to build up of maximum particulate material on the side walls of the body.

The body of the present invention may have any configuration so as to conform it to many different sizes and configurations of ducts and conduits commonly employed in manufacturing and industrial operations. Thus, the body may have a substantially U-shaped configuration with side walls disposed perpendicular to recessed central wall portion. Alternately, the body may have an arcuate or semi-circular configuration in which the side walls and the central wall portion form a continuous arcuate cross-section.

The wear resistant insert of the present invention overcomes many of the problems encountered with previously devised wear resistant inserts with use in particulate material flow ducts. By enabling the particulate material flowing through the duct to act as a barrier itself against wear of the insert and the adjacent wall surface of the duct, wear of the insert and the surrounding wall surface of the duct are minimized. This leads to an increased useful life of the wear resistant insert and the wall surface of the duct at the directional change points. Furthermore, the wear resistant insert of the present invention is inexpensive to manufacture and can be easily and inexpensively repaired or replaced.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
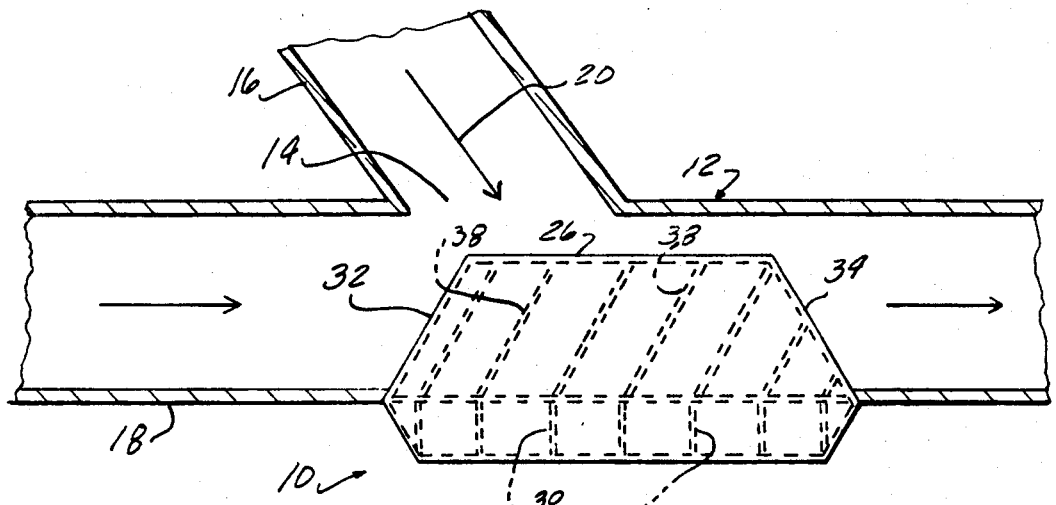
FIG. 1 is a cross-sectional view showing the mounting of the wear resistant insert of the present invention within a particulate material flow duct.

Throughout the following description and drawing, an identical reference number is used to refer to the same component shown in multiple figures of the drawing.

Figure 2:
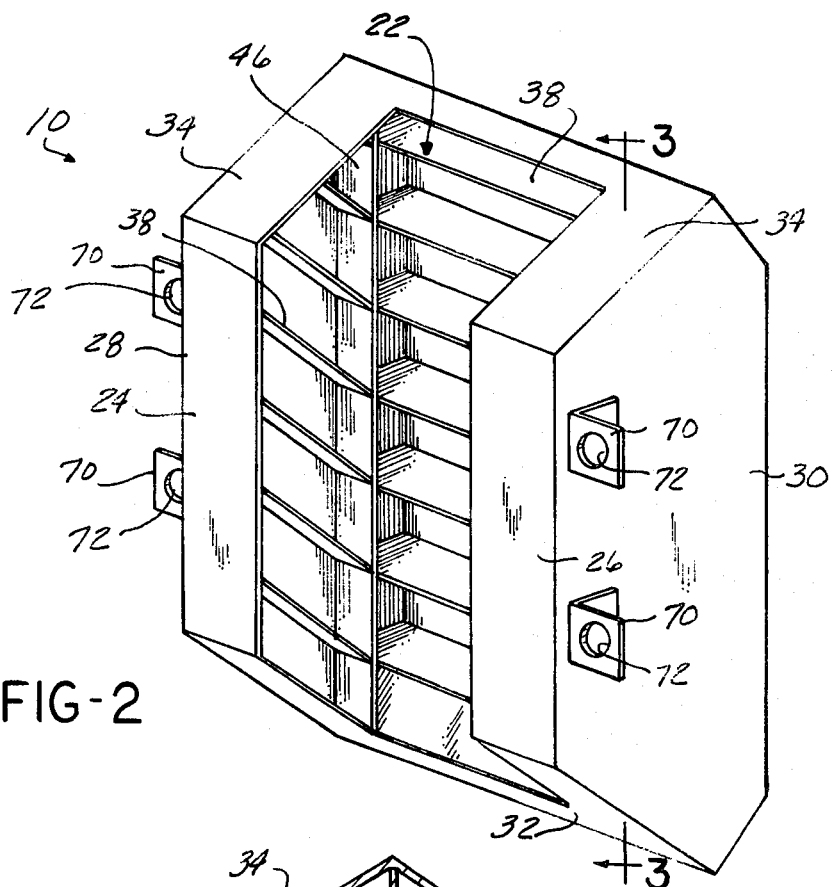
FIG. 2 is a perspective view of the wear resistant insert illustrated in FIG. 1.
Figure 3:
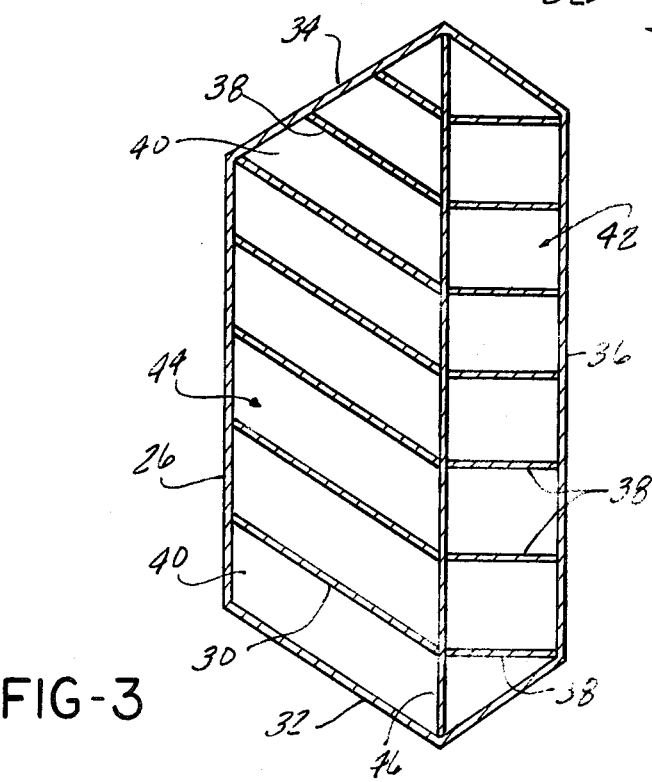
FIG. 3 is a cross-sectional view, generally taken along line 3—3 in FIG. 2.

Referring now to the drawing, and to FIGS. 1, 2 and 3 in particular, there is illustrated a wear resistant insert 10 which is adapted to be mounted at the directional change points within ducts 12 carrying particulate material at a high velocity. Such ducts 12 are typically employed to remove ash from incinerators or furnaces, to transport or carry particulate material between various manufacturing locations and to separate heavier particles from lighter particles in cyclone separators.

It should also be noted that the term "ducts" is meant to include any member carrying a flow of particulate material. Such members include, by example and not limitation, conduits, cyclone separators, etc.

The wear resistant insert 10 acts as a wear resistant surface at a directional change point within the duct 12. Such directional change points may be encountered at a Y-shaped intersection 14, as shown in FIG. 1, wherein two ducts 16 and 18 intersect and form a single larger duct. Alternately, the wear resistant insert 10 may be employed at branch locations and at 45° or 90° bends or elbows within the ducts 12 as well as on the inner wall surface of cyclone separators.

At such directional change points, the oncoming particulate material 20 strikes an inner wall surface of the duct 12 at an extremely high velocity. Due to its high velocity, the particulate material acts as an extremely high abrasive which causes rapid deterioration of the inner wall surface of the ducts. The wear resistant insert 10 of the present invention is adapted to minimize such wear or abrasion of the wall surfaces of the duct at the directional change points within the duct.

There is shown in FIG. 1 and in greater detail FIGS. 2 and 3, one embodiment of a wear resistant insert 10 of the present invention. The wear resistant insert 10 includes a body 22 having opposed top surfaces 24 and 26, opposed side walls 28 and 30 depending from the top surfaces 24 and 26, respectively, opposed end walls 32 and 34 and a recessed central wall portion 36. The central wall portion 36 extends between and is joined to or integrally formed with the lower ends of the opposed side walls 28 and 30.

The end walls 32 and 34 may have any desired configuration depending upon the configuration of the duct in which the insert is to be mounted. Thus, the ends walls 32 and 34 could have a planar form which extends between the upper surfaces 24 and 26 and the back wall of the central wall portion 36. Alternately, as shown in FIGS. 1, 2, 3 and 4, the ends walls 32 and 34 are formed with two angularly disposed portions for easy mounting of the insert 10 within a duct, such as a duct 12.

As shown in FIG. 1, the top surfaces 24 and 26 and the end walls 32 and 34 are formed with interconnected planar strip members which are attached to the side walls 28 and 30 and the central wall portion 36 and extend inward from the side walls 28 and 39 and upward from the recessed central wall portion 36 to form a central recess within the interior of the body 22.

The body 12 is also provided with means mounted on the opposde side walls 28 and 30 and the recessed central wall 36 for forming a plurality of spaced cavities within the interior of the body 22 which are adapted to collect particulates flowing across the body 22. In a preferred embodiment, the means for forming the cavities comprises a plurality of spaced, planar ribs 38 which are mounted on the opposed side walls 28 and 30 and the central wall 36 of the body 22 and extend inward from the opposed side walls 28 and 30 and the central wall portion 36. The spaced ribs 38 form a plurality of successive cavities 40 therebetween which are adapted to trap and collect particulate material flowing across the body 22.

During the use of the body 22 at the directional change point of a duct 12, the cavities 40 function to progressively trap particulate material which flows across the body 22 such that the particulate material gradually builds up within each cavity 40 until the particulate material completely fills each cavity 40 to the upper end of each rib 38. The upper surface of the particulate material within each cavity 40 thus acts as a wear or abrasion resistant barrier to further erosion of the wear resistant insert 10 by the particulate material flowing there across. This promotes greater life expectancy for the wear resistant insert 10 of the present invention.

In a preferred embodiment, the rib members 38 are arranged in first and second sets 42 and 44. The first set 42 of ribs 38 is mounted on the recessed central wall portion 36 at a first pre-determined angle. The first pre-determined angle is selected so as to maximize collection of particulate material within the cavities 40 formed between the ribs 38 of the first set of ribs 42. As the wear resitant insert 20 is typically mounted at a directional change point in a duct 12, the ribs 38 in the first set of ribs 42 are typically disposed perpendicular to the central wall portion 36 so as to be substantially parallel to the oncoming flow of particulate material.

The second set 44 of the ribs 38 is mounted on the opposed side walls 28 and 30 of the body 22 and extends inward therefrom. First and second planar support members 46 and 48 are disposed within the interior of the body 22 and are mounted on top of the opposed ends of the ribs 38 in the first set of ribs 42.

The ribs 38 in the second set of ribs 44 extend between and are mounted to the first and second support members 46 and 48 and the planar strip members forming the top surfaces and end walls of the body 22. The ribs 38 in the second set of ribs 44 are disposed at a second, different pre-determined angle with respect to the first set of ribs 42.

The side walls 28 and 30 of the body 22 may be formed in any configuration depending upon the size and shape of the duct in which the insert 10 is to be mounted. Thus, side walls 28 and 30 can have a square, rectangular, trapezoidal, etc., configuration.

Figure 5:
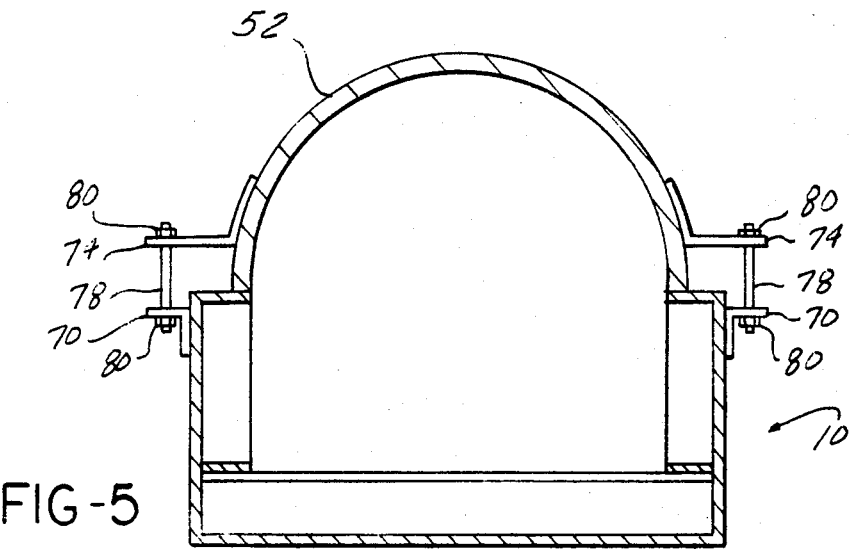
FIG. 5 is a cross-sectional view, generally taken along line 5—5 in FIG. 4.

The body 22 is mounted on the duct 12 in any conventional manner. In a preferred embodiment, a plurality of angle plates or brackets 70, as shown in FIGS. 2 and 5, are mounted on the side walls of the body 22. Each angle bracket 70 is provided with an aperture 72. The angle brackets are mounted on the side walls of the body 22 in any conventional manner, such as by welding, or through the use of suitable fasteners. A similar number of angle brackets 74 are mounted on the duct, such as duct 52 shown in FIG. 5. The angle brackets 74 also have an aperture formed therein which is adapted to be co-axially aligned with the aperture 72 in the angle bracket 70 on the body. A threaded fastener, such as a bolt 78 is passed through the aligned apertures and secured by nuts 80 to securely mount the insert of the present invention in a duct.

The cross-sectional configuration of the body 22 of the wear resistant insert 10 of the present invention may also have configurations other than the U-shaped configurations shown in FIGS. 1, 2 and 3. Thus, for example, the body 22 may be formed in a substantially arcuate or semi-circular configuration.

Figure 4:
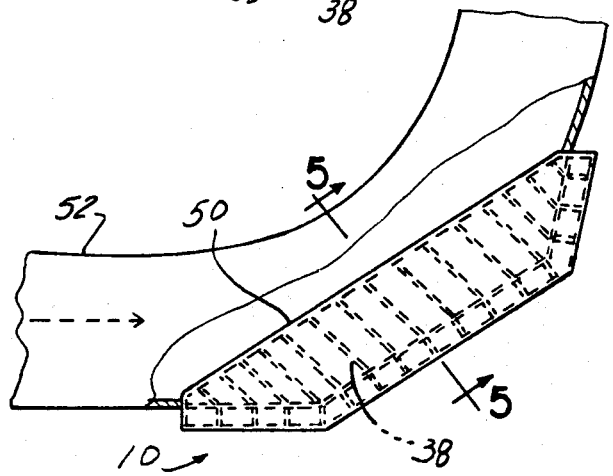
FIG. 4 is a cross-sectional view showing the mounting of another embodiment of the wear resistant insert of the present invention in a circular particulate material flow duct.

The wear resistant insert 10 of the present invention may also be employed at elbows or bends in ducts, as shown in FIG. 4. Depending on the size of the elbow or bend, one or more identically formed bodies 22 may be aligned successively along the length of the elbow to provide complete protection over the entire directional change area of the elbow or bend. Alternately, the body 22 may be formed with elongated side walls and a central wall portion, as shown in FIG. 4 to provide complete protection across the length of the elbow.

In constructing wear resistant insert 10 of the present invention, the various components walls and ribs are formed of a high wear resistant or abrasion resistant material. A metal or metal alloy, such as steel, stainless steel, etc. is preferred. The exterior exposed surfaces of the wear resistant insert 10 which initially encounter the flow of the particulate material flowing through the duct should be formed of a material having a higher wear resistance than the material required to form the remaining components of the insert 10. Thus, in the embodiment shown in FIGS. 1 and 2, the exposed end wall 32 of the body 22 and the first rib 38 of the central wall portion 36 may be formed of stainless steel; while the remaining ribs 38, side walls, etc. can be formed of a conventional steel so as to reduce costs and yet obtain the needed abrasion or wear resistance.

Figure 6:
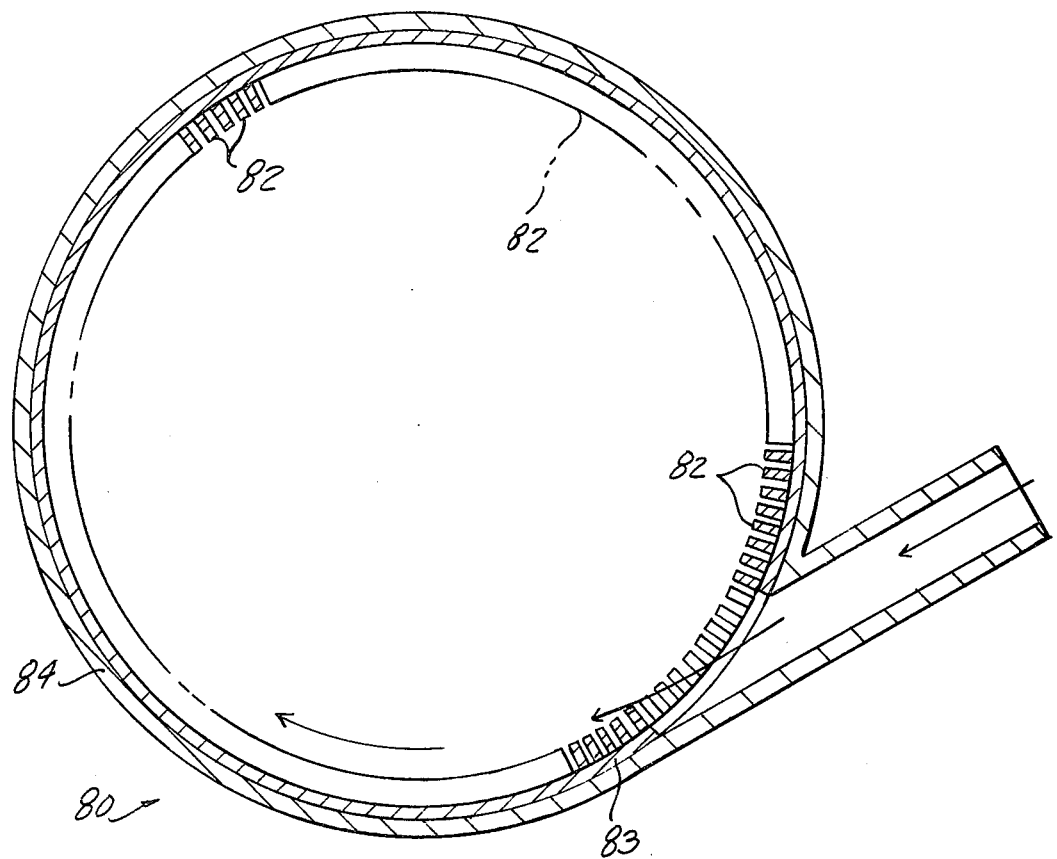
FIG. 6 is a top, cross-sectional view of a cyclone separator having a wear resistant insert of the present invention mounted therein.

The wear resistant insert of the present invention may also be advantageously employed in cyclone separators such as cyclone separator 80 shown in FIG. 6. Cyclone separators are utilized to separate heavy from lighter particles by means of inducing a cyclone type flow of the particulate material.

In order to prevent wear on the interior surface of the side walls 84 of the cyclone separator 80 a plurality of spaced ribs 82 are mounted on the interior surfaces of the side walls 84. The ribs 82 extend vertically within the housing of cyclone separator 80 and may be individually mounted on the side walls 84 as shown in FIG. 6 or attached in modular units containing a number of spaced ribs, with the modular units in turn being mounted directly on the side walls 84 of the housing of the cyclone separator 80. The ribs 82 function in the same manner as that described above to collect particulate material such as the trapped particulate material within the cavity formed between adjacent spaced ribs 82 acts as a buffer against wear of the side walls of the cyclone separator 80.

In summary, there has been disclosed a unique wear resistant insert for use at directional change points in ducts carrying high velocity particulate material flow. The insert of the present invention may have configuration of any desired shape and size which will conform to the particular size and shape of the duct of which it is to be used. The insert is inexpensive to manufacture and can be easily and inexpensively repaired or replaced. Furthermore, by uniquely trapping and collecting particulate material flowing thereacross, the insert of the present invention enables the particulate material itself to act as a further barrier to continued wear of the insert and/or the adjacent wall surface of the duct. This minimizes wear and extends the useful life of the wear resistant insert and inner wall surface of the duct at the various directional change points.

What is claimed:

1. A wear resistant insert for particulate material flow ducts comprising:
    a body mounted within a duct, having a central wall portion and a spaced side wall integral with the central wall portion and extending outward therefrom to form a recess within the body; and
    means mounted on the body, for forming a plurality of cavities in the body adapted to collect particulate material flowing across the body, wherein the means comprises:
    a plurality of spaced, planar ribs mounted on the side walls and the central portion of the body to form successively spaced cavities within the interior of the body;
    a first set of spaced planar ribs mounted on and extending upward from the central wall portion of the body; the first set of ribs forming a plurality of spaced cavities extending longitudinaly along the central wall portion of the body;
    a second set of spaced, planar ribs mounted on and extending inward from the side walls of the body, the second set of ribs forming a plurality of spaced cavities extending longitudinaly along the sides walls of the body;
    the first set of ribs extending at a first pre-determined angle from the central wall portion of the body; and
    the second set of ribs extending at a second, different pre-determined angle with respect to the first set of ribs.

2. A wear resistant insert for particulate material flow ducts comprising:
    a body mounted within the duct having a central wall portion and a spaced side wall integral with the central wall portion and extending outward therefrom to form a recess within the body; and
    means mounted on the body, for forming a plurality of cavities in the body adapted to collect particulate material flowing across the body, with the collected particulate material acting as the barrier to wear of the body comprising:
    a plurality of spaced, planar ribs mounted on the side walls and the central wall portion of the body to form successively spaced cavities within the interior of the body;
    a first set of spaced, planar ribs mounted on and extending upward from the central wall portion of the body, the first set of ribs forming a plurality of spaced cavities extending longitudinaly along the central wall portion of the body;
    a second set of spaced planar ribs mounted on and extending inward from the side walls of the body, the second set of ribs forming a plurality of spaced wall cavities extending longitudinaly along the side walls of the body; and
    first and second planar members mounted on the top of opposed ends of the first set of ribs, the first and second planar support members supporting the bottom end of the second set of ribs.

3. A wear resistant insert for particulate material flow ducts comprising:
    a body mountable within the duct and having spaced side walls integral with and extending outward from a central wall portion to define a recess within the body;
    a first set of spaced, planar ribs mounted on and extending upward from the central wall portion of the body, the first set of ribs forming a plurality of spaced cavities extending longitudinaly along the central wall portion of the body;
    first and second planar members mounted on the top of opposed ends of the first set of ribs; and
    a second set of spaced, planar ribs mounted on the first and second planar members and extending inward from the side walls of the body, the second set of ribs forming a plurality of spaced cavities extending longitudinaly along the side walls of the body.

* * * * *